United States Patent [19]

Eschbach

[11] Patent Number: 5,426,005
[45] Date of Patent: Jun. 20, 1995

[54] INTERPENETRATING POLYMER NETWORK ELECTROLYTES AND ELECTROCHEMICAL CELLS USING SAME

[75] Inventor: Florence Eschbach, Sunrise, Fla.

[73] Assignee: Motorola, Inc., Schaumburg, Ill.

[21] Appl. No.: 198,709

[22] Filed: Feb. 18, 1994

[51] Int. Cl.$^6$ ............................................. H01M 6/18
[52] U.S. Cl. ................................... 429/192; 252/62.2
[58] Field of Search ....................... 429/192; 252/62.2

[56] References Cited

U.S. PATENT DOCUMENTS 4,654,279  3/1987  Bauer et al. .
4,664,757  5/1987  Zupancic et al. .
4,664,761  5/1987  Zupancic et al. .
5,273,846  12/1993  Plichta et al. .

OTHER PUBLICATIONS

Visscher, et al, Synthesis and Characterization of Poly-(organo phosphazene)Interpenetrating Polymer Networks; American Chemical Society Advances in Chemistry Services 1994 (No Month).

*Primary Examiner*—John S. Maples
*Attorney, Agent, or Firm*—Kenneth M. Massaroni

[57] ABSTRACT

A gradient interpenetrating polymer network electrolyte for rechargeable electrochemical cell, and a rechargeable electrochemical cell including said electrolyte. The interpenetrating polymer network electrolyte consists of a first polymeric material having a first set of electrochemical and morphological characteristics, and a second polymeric material having a second set of electrochemical and morphological characteristics. A rechargeable electrochemical cell is made by disposing the interpenetrating polymer network electrolyte between a positive and a negative electrode.

24 Claims, 1 Drawing Sheet

INTERPENETRATING POLYMER NETWORK ELECTROLYTES AND ELECTROCHEMICAL CELLS USING SAME

TECHNICAL FIELD

This invention relates in general to the field of rechargeable electrochemical cells, and more particularly, to electrochemical battery cells including electrolytes.

BACKGROUND

There is a great deal of interest in developing better and more efficient means for storing energy for applications such as radio communication, satellites, portable computers, and electrical vehicles, to name but a few. Accordingly, there have been recent concerted efforts to develop high energy, cost effective battery cells having improved performance characteristics. Electrochemical battery cells are preferred and hence widely used in these applications since the chemical reactions which take place in the cells can be converted into useful electrical energy.

An electrochemical battery cell uses its reactive components, namely the positive and negative electrodes, to generate an electric current. The electrodes are separated from one another by an electrolyte which maintains ionic conduction between the two electrodes. Electrons flow from one electrode through an external circuit to the other electrode completing the circuit. Rechargeable, or secondary, cells are more desirable than primary (non-rechargeable) cells since the associated chemical reactions are reversible. Accordingly, electrodes for secondary cells must be capable of being regenerated (i.e. recharged) many times. The development of advanced rechargeable cells depends on the design and selection of appropriate materials for the electrodes and the electrolyte.

Currently, electrolytes used in rechargeable electrochemical cells include a polymer, such as a polyethylene oxide (PEO), impregnated with a salt in a solvent. These salts include, for example, $LiPF_6$, $LiBF_4$, $LiAsF_6$, $LiCF_3SO_3$, $LiN(CF_3SO_2)_2$, and $LiClO_4$ to name but a few. The solvents include ethylene carbonate (EC), propylene carbonate (PC), glycol diethers (glymes), and combinations thereof.

A schematic representation of the prior art electrochemical cell is illustrated in FIG. 1. Specifically, FIG. 1 illustrates a positive electrode 10, and a negative electrode 20. Disposed between said positive and negative electrodes is the electrolyte 30. The positive electrode/electrolyte interface 32 is created at the boundary between the positive electrode 10 and the electrolyte 30. Similarly, a negative electrode/electrolyte interface 34 is created at the boundary of the negative electrode 20 and the electrolyte 30. As may be appreciated from a perusal of FIG. 1, the electrolyte is in direct contact with both the negative and positive electrodes.

Present day state-of-the-art polymer electrolyte batteries are often plagued by electrode/electrolyte incompatibilities. Specifically PEO, EC, PC, and glymes all include carbon/oxygen bonds which are particularly reactive with the lithium in lithium batteries. Thus, at the negative electrode/electrolyte interface 34, the negative electrode and the electrolyte solvent may react to form an ionically insulating layer on the surface of the negative electrode material. This ionically insulating layer blocks the transport of lithium ions, and reduces active material reaction sites, effectively isolating the negative electrode. The result is reduced capacity with cycling (i.e., repeated charge/discharge) and poor cycle life.

At the positive electrode/electrolyte interface 32, problems include thermodynamic instability of the electrolyte due to the higher electrode potentials of the positive electrode. This causes electrolyte decomposition, and electrolyte outgassing. The result of outgassing and decomposition is increased internal cell pressure, reduced cell performance, and ultimately, explosive cell failure. The problem of electrolyte decomposition has been addressed by operating the cell at less than the positive electrode's half cell potential. That is, at a potential at which the electrolyte remains stable. However, this results in decreased energy density, and a decreased charge per cycle.

Another problem inherent in current electrode/electrolyte pairs relates to disruptions in the contact between the electrolyte and the electrodes, resulting from thermal fluctuations during cycling. That is, as the electrochemical cell is cycled, the lithium anode swells and contracts. This results in loss of contact between the anode and the electrolyte, and accordingly, failure of the cell.

Accordingly, there exists a need for an electrolyte which has enhanced conductivity, yet reduces or eliminates the deleterious reactions characterizing prior art electrolytes.

SUMMARY OF THE INVENTION

Briefly, according to the invention, there is provided an electrolyte for a rechargeable electrochemical cell such as a lithium battery. The electrolyte comprises an interpenetrating polymer network of at least a first polymeric material and a second polymeric material. The interpenetrating polymer network may be a gradient network wherein the electrochemical and morphological characteristics of a first surface of the electrolyte transitions through a transition zone, to a second surface having a second set of electrochemical and morphological characteristics.

One of said polymeric materials may be an ionically conducting polymeric material exhibiting relatively high conductivity. This polymeric material may be selected from the group of materials consisting of, for example, polyethers, polyether derivatives, polyether modified inorganic polymers such as polyorganophosphazenes or polyorganosiloxanes, and combinations thereof. The second polymeric material may be a polymeric material which is electrochemically stable in the presence of the lithium anode in a lithium ion electrochemical cell. The polymeric material should further be adapted to accommodate the thermal and volumetric changes occasioned by cycling of the lithium anode. Materials for said second polymeric material may include vinyl polymers having polar groups such as polyvinylidenechloride, polyacrylonitrile, and combinations thereof. The interpenetrating polymer network may further include a third polymeric material disposed on the side of the electrolyte opposite the second polymeric material. The third polymeric material may be electrochemically compatible with the cathode of the electrochemical cell into which it is disposed. Materials which may be used as the third polymer are the same as those used for the second polymer.

Also, according to the invention, there is provided an electrochemical cell comprising a lithium intercalation anode, a cathode fabricated from a material having a relatively high electrode potential versus lithium, and an electrolyte disposed between the anode and the cathode, and comprising an interpenetrating polymer network as described hereinabove.

DETAILED DESCRIPTION OF THE PREFERRED EMBODIMENTS

Figure 1:
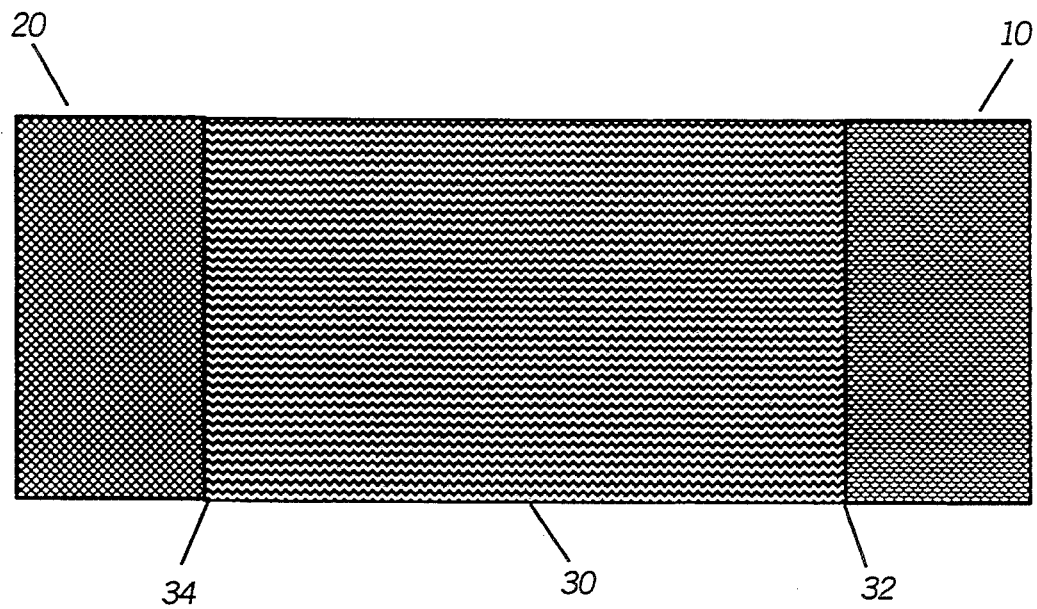
FIG. 1 is a schematic representation of the prior art design of a lithium anode/polymer electrolyte electrochemical cells.

While the specification concludes with claims defining the features of the invention that are regarded as novel, it is believed that the invention will be better understood from a consideration of the following description in conjunction with the drawing figures, in which like reference numerals are carried forward.

Figure 2:
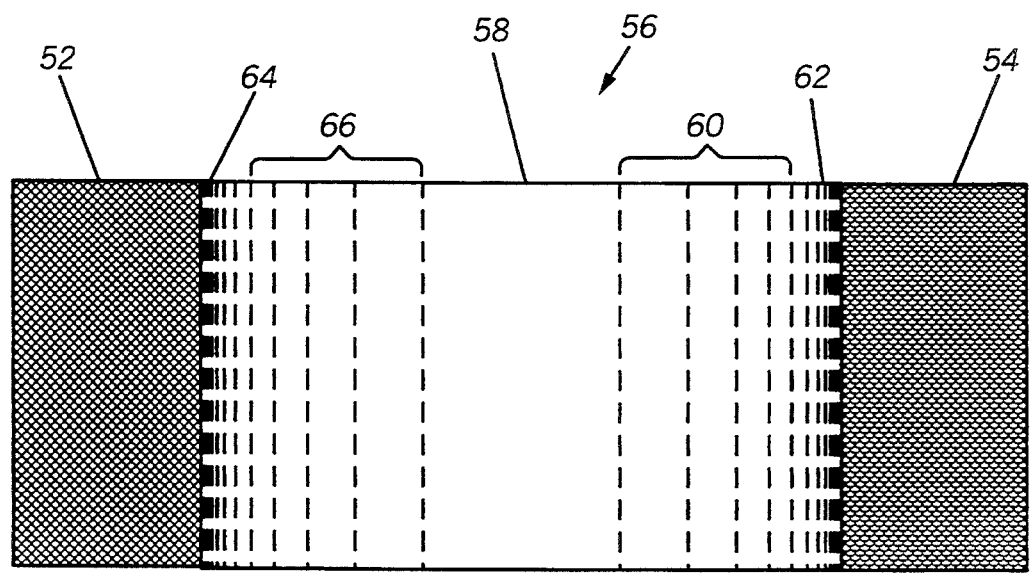
FIG. 2 is a schematic representation illustrating an electrochemical cell in accordance with the instant invention.

The present invention relates to electrolyte structures for electrochemical cells, and cells made including those electrolyte structures. Referring now to FIG.2, there is illustrated an electrochemical cell 50 including a negative and a positive electrode and an interpenetrating polymer network electrolyte in accordance with the present invention. The electrochemical cell 50 includes a negative electrode 52 fabricated of, for example, elemental lithium. Of course, other materials may be selected for use as the negative electrode, including, for example, lithium alloys, e.g., Al/LiAl, $Li_xSi$, Wood's alloy, lithiated carbon, and other low potential intercalation materials such as materials having the general formula $Li_xMN_y$ a where M is a transition metal, and N is selected from the group of elements including oxygen, sulfur, or silicon.

The electrochemical cell further includes a positive electrode 54 fabricated of, for example, materials having high electrode potentials versus lithium. Specific examples of these materials include lithiated oxides of transition metals, such as, $Li_xNiO_y$, $Li_xVO_y$, $LiMnO_y$, $LiCoO_y$, and $LiTiS_y$. It is to be understood that when materials other than elemental lithium are used as the negative electrode, the positive electrode may also be varied. Thus, for example, when the negative electrode is fabricated of lithiated carbon, the positive electrode may be $Li_xCoO_y$. Other combinations of negative electrode and positive electrode materials will be readily apparent to one of ordinary skill in the art.

Operatively disposed between the electrode 52 and the positive electrode 54 is an electrolyte 56 comprising a gradient interpenetrating polymer network of at least a first polymeric material and a second polymeric material. A gradient interpenetrating polymer network consists of two or more individual polymers cross linked through independent routes resulting in at least two three-dimensional networks combined within each other through molecular chain entanglements. In this way, a "multi-layered" electrolyte structure is formed.

As used herein, multi-layer refers to the fact that the electrolyte has a first set of electrochemical and morphological characteristics at one surface thereof, a second set of electrochemical and morphological characteristics at a second surface thereof, and the characteristics change through a transition zone from said first to said second surface. It may be further appreciated that there is no distinct interface between the first and second polymers in said electrolyte. FIG. 2 illustrates that the first polymer 58 becomes intertwined via molecular entanglements with the second polymer 62 in the transition region 60. This combination does not disrupt the ionically conducting bulk properties of the first polymer. Similarly, the first polymer 58 may become intertwined with a third polymer 64 (in contact with electrode 52) in a transition region 66.

Two methods are typically used in synthesizing interpenetrating polymer networks. The first is a simultaneous procedure in which all of the reactants are mixed in homogenous solution and polymerized and cross linked by non-interfering reactions. The second synthesis procedure is a sequential type of reaction in which the first polymer network is swollen with a monomer, cross linking agent, and free radical initiator for the second polymer network. After swelling, the second polymeric network is formed in situ the already cross linked first polymer network.

The gradient interpenetrating polymer network is preferably formed in a sequential procedure. A sequential procedure is preferred since it allows for the formation of non-interfering polymer networks. That is, the polymers do not react with one another. In the gradient interpenetrating polymer networks of the instant invention, both polymer networks may be formed by traditional radiation or thermal cross linking procedures as are known in the art. The first polymer network may be preferably radiation cross linked by exposure to gamma radiation. Specifically, exposure of polyethers to gamma radiation generates radicals by hydrogen abstraction and transcombination of these radicals forms cross links. Thereafter, the first polymer network is swollen in a second polymer network mixture of monomer II, a crosslinking agent for monomer II, and a free radical initiator for monomer II. The depth of the interpenetration may be controlled by the amount of time the first polymer network is exposed to the monomer II mixture.

In the case of a lithium polymer electrolyte battery, the first polymer network may be an ionically conducting polymer exhibiting high conductivity at room temperature. Examples of such polymer include polyethers, polyether derivatives, polyether modified inorganic polymers such as polyorganophosphazenes or polyorganosiloxanes, and combinations thereof. The transition zone at the anode interface will consist of the first polymer network formed as described above, and combined to form a gradient interpenetrating polymer network with the second polymer network. The second polymer network preferably exhibits improved electrochemical stability versus the anode. The second polymer network should also demonstrate resilient mechanical properties to accommodate changes of volume, and thermal expansion of the lithium anode.

In a preferred embodiment, the second polymer network may be fabricated of vinyl polymers having polar groups such as polyvinylidenechloride, polyacrylonitrile, and combinations thereof. The second polymer network may be preferably thermally crosslinked, by combining a monomer II, such as acrylonitrile or vinylidenechloride, with a crosslinking agent and a free radical initiator. The crosslinking agent may be any vinyl or allyl derivative that does not contain C—O or C=O bridging groups. Preferred crosslinking agents include divinylbenzene, 1,3 divinyltetramethydisiloxane, and diallyldimethylsiloxane to name a few. The second polymer network may also be thermally cross linked in situ the first polymeric network. The free radical generator may be a peroxide or azo compound, such as 2,2 azobisisobutyronitrile. The resulting second polymer network, either polyvinylidenechloride or polyacrylonitrile, is less reactive in the presence of lithium than are polyethers, due to the absence of highly reactive C/O bonds in the polymer. Moreover, to the extent that they are reactive, the resulting passivation layer deposited on the electrode surface continues to behave as an electrolyte, and not as a resistive layer blocking the passage of lithium ions. Moreover, polyacrylonitrile and polyvinylidenechloride solvate lithium ions due to the presence of polar groups in their structure.

An advantage of a gradient interpenetrating polymer network is as a surface modification technique to improve structural integrity. Delamination and interfacial constraints are avoided as well. Conversely, in traditional multi-layered structures, inadequate contact and adhesion, as well volume changes resulting from thermal fluctuations of the anode or cathode often disrupt the contact between the layers. In gradient interpenetrating polymer networks, the physical interlocking of the second polymer inside the first polymer prevents delamination effects. Moreover, when used in a nonaqueous environment, the second polymer network may be allowed to become entwined in the electrode materials, thereby enhancing the mechanical stability of the entire structure.

The methodology described above may also be advantageously applied to a third polymer network disposed on the side of the first polymer network opposite polymer II. Thus, one may provide a second transition zone from a polymer I to a polymer III at the cathode interface.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte for use in a lithium anode, polymer electrolyte electrochemical cell;
said electrolyte comprising an interpenetrating polymer network gradient of at least a first polymeric material and a second polymeric material.

2. An electrolyte as in claim 1, wherein said first polymeric material is an ionically conducting polymer exhibiting high conductivity.

3. An electrolyte as in claim 2, wherein said first polymeric material is selected from the group of materials consisting of polyethers, polyether modified inorganic polymers such as polyorganophosphazenes or polyorganosiloxanes, and combinations thereof.

4. An electrolyte as in claim 1, wherein said second polymer's material is electrochemically stable in the presence of said lithium anode.

5. An electrolyte as in claim 4, wherein said second polymeric material is adapted to accommodate thermal and volumetric changes in said lithium anode.

6. An electrolyte as in claim 5, wherein said second polymeric material is selected from the group of materials consisting of vinyl polymers containing polymer groups such as polyacrylonitrile, polyvinylidenechloride, and combinations thereof.

7. An electrolyte as in claim 1, further including a third polymeric material disposed on a side of said electrolyte opposite said second polymeric material.

8. An electrolyte as in claim 7, wherein said third polymeric material is electrochemically compatible with the cathode of said electrochemical cell.

9. An electrolyte for use in a lithium anode, electrochemical cell, said electrolyte comprising an interpenetrating polymeric network gradient of at least two polymeric materials, and having a first surface with a first set of electrochemical and morphological characteristics, and a second surface having a second set of electrochemical and morphological characteristics.

10. An electrolyte as in claim 9, wherein said first polymeric material is an ionically conducting polymer exhibiting high conductivity.

11. An electrolyte as in claim 10, wherein said first polymeric material is selected from the group of materials consisting of polyethers, polyether modified inorganic polymers such as polyorganophosphazenes or polyorganosiloxanes, and combinations thereof.

12. An electrolyte as in claim 9, where said second polymer's material is electrochemically stable in the presence of said lithium anode.

13. An electrolyte as in claim 12, where said second polymeric material is adapted to accommodate thermal and volumetric changes in said lithium anode.

14. An electrolyte as in claim 9, wherein said second polymeric material is selected from the group of materials consisting of vinyl polymers containing polyacrylonitrile, polyvinylidenechloride, and combinations thereof.

15. An electrolyte as in claim 9, further including a third polymeric material disposed on a side of said electrolyte opposite said second polymeric material.

16. An electrolyte as in claim 15, wherein said third polymeric material is electrochemically compatible with the cathode of said electrochemical cell.

17. An electrochemical cell comprising:
a lithium intercalation anode;
a cathode fabricated of a material having a high electrode potential versus lithium; and
an electrolyte disposed between said anode and said cathode, and comprising an interpenetrating polymer network gradient of at least a first and a second polymeric material.

18. An electrolyte as in claim 17, wherein said first polymeric material is an ionically conducting polymer exhibiting high conductivity.

19. An electrolyte as in claim 18, wherein said first polymeric material is selected from the group of materials consisting of polyethers, polyether modified inorganic polymers such as polyorganophosphazenes or polyorganosiloxanes, and combinations thereof.

20. An electrolyte as in claim 17, where said second polymer's material is electrochemically stable in the presence of said lithium anode.

21. An electrolyte as in claim 20, wherein said second polymeric material is adapted to accommodate thermal and volumetric changes in said lithium anode.

22. An electrolyte as in claim 21, wherein said second polymeric material is selected from the group of materials consisting of vinyl polymers containing polar groups, such as polyacrylonitrile, polyvinylidenechloride, and combinations thereof.

23. An electrolyte as in claim 17, further including a third polymeric material disposed on a side of said electrolyte opposite said second polymeric material.

24. An electrolyte as in claim 23, wherein said third polymeric material is electrochemically compatible with the cathode of said electrochemical cell.

* * * * *